United States Patent [19]

Wheeler

[11] 4,455,045

[45] Jun. 19, 1984

[54] MEANS FOR MAINTAINING ATTACHED FLOW OF A FLOWING MEDIUM

[76] Inventor: Gary O. Wheeler, 1080 Vallejo Cir., Costa Mesa, Calif. 92626

[21] Appl. No.: 314,735

[22] Filed: Oct. 26, 1981

[51] Int. Cl.³ .............................................. B62D 35/00
[52] U.S. Cl. .................................. 296/1 S; 105/2 R; 244/53 B; 244/200
[58] Field of Search .............. 244/200, 53 B; 296/1 S, 296/91, 24 C; 105/2 R, 2 A

[56] References Cited

U.S. PATENT DOCUMENTS

| | | | |
|---|---|---|---|
| 3,672,718 | 6/1972 | Broyer | 296/1 S |
| 3,836,191 | 9/1974 | Gotz | 296/1 S |
| 4,268,892 | 5/1981 | Pfeiffer et al. | 296/1 S |
| 4,343,506 | 8/1982 | Saltzman | 296/1 S |

FOREIGN PATENT DOCUMENTS

1295126  11/1972  United Kingdom ................ 296/1 S

Primary Examiner—Richard A. Bertsch
Attorney, Agent, or Firm—George W. Finch

[57] ABSTRACT

One or more channels whose edges generate streamwise vortices from heights coincidental with a local flow-control surface into the channels are used to maintain attached flow of a fluid medium flowing therepast, even in areas of severe regional adverse pressure gradients. The channels are generally triangular in shape with the apex forwardmost in the flow. The channels work very effectively when nested in series and are most effective when the channels extend to the trailing edge of a flow-control surface.

53 Claims, 16 Drawing Figures

MEANS FOR MAINTAINING ATTACHED FLOW OF A FLOWING MEDIUM

BACKGROUND OF THE INVENTION

There are many applications where it is desired to have a low drag method of delaying or preventing flow separation between a flowing fluid and a flow-control surface in regions where, due to contours of the flow-control surface, the fluid's boundary layer is subjected to adverse pressure gradients normally sufficient to cause flow separation.

The purpose of such boundary layer control is to delay or prevent flow separation. When a viscous fluid boundary layer flows from a region of low static pressure to a region of high static pressure, as when passing over a wing toward the trailing edge, it is said to be in a region of adverse pressure gradient. This results in forces tending to retard the boundary layer which can become strong enough to arrest and reverse the flow. This in turn causes the fluid to separate from the flow-control surface and no longer be influenced predictably by the downstream contour. The result is increased drag due to the large cross-sectional area of separated flow in the wake of the flow control surface. In the case of a stalled wing, degraded lift is accompanied by a rise in drag.

One useful but relatively high drag method heretofore used is to generate streamwise vortices for the purpose of mixing free-stream flow with the boundary layer to delay or totally prevent flow separation. Generally, there are two categories of vortex generators. The first category covers those devices that protrude well into and usually somewhat above the 99% boundary layer height. Included in this category are conventional vane-type vortex generators as well as prior art ramp-type generators of varying planform shapes. Unfortunately, these devices achieve boundary layer control only at the penalty of considerable drag. An example of the ramp-type vortex generator is shown in STEPHENS, U.S. Pat. No. 2,800,291. STEPHENS teaches the use of ramp-type generators positioned in rows at right angles to the flow with the generators extending back to some intermediate position on the flow-control surface.

The second and less familiar category of vortex generators uses the "Taylor-Goetler instability" to generate streamwise vortices within the boundary layer when a fluid is caused to flow over a concave surface. This alternative is more subtle, but the vortices are still left to travel downstream on the primary flow-control surface, causing turbulent mixing between the boundary layer and the free-stream and resulting in an unwanted drag increment. Devices of this category are disclosed by KUETHE in U.S. Pat. Nos. 3,578,264 and 3,741,285. KUETHE teaches selected discontinuities positioned both above and below the level of the adjacent flow-control surface which in effect squeeze the boundary layer between adjacent protrudences to eject a vortex into the boundary layer and cause mixing.

It is unfortunate that the prior art vortex generators either operate relatively ineffectively or cause an excess in drag since devices are needed which enable the turning of air flows about sharp cambers. Normally, conventional attempts to reduce the wake and hence the drag of a body moving with respect to a fluid medium by mere curved and tapered body contours in the rear result in pressure recovery regions that are limited by flow separation occurring in the regions of adverse pressure gradients. The flow separation in such instances normally occurs downstream of a body's maximum cross-section.

For example, road vehicles, which are designed for low drag must include very gentle rear deck curvatures to maintain attached flow over a substantial region behind the maximum cross-section. Except in the instance of specially constructed high-speed race cars, full recovery cannot be achieved in the length available on roadable vehicles. A Porsche 924, which is a well streamlined vehicle still has a coefficient of drag ($C_D$) of approximately 0.35. If all the wake drag caused by flow separation could be eliminated, the $C_D$ could approach 0.25 and result in a considerable fuel savings or speed capability. For comparison, a utilitarian car, such as a Volkswagon Rabbit, (where there is very little attached flow past the maximum cross-section) has a $C_D$ of about 0.45. Elimination of the wake drag caused by flow separation could in theory reduce the $C_D$ to about, 0.30 with no other changes to the vehicle. Although there have been countless attempts to reduce the drag of road vehicles by maintaining attached flow, considerations such as structural weight and aesthetics restrict the length of road based vehicles to such an extent that at some point the body contours must be so abrupt that adverse pressure gradients occur. These produce flow separations which generate a relatively large separation wake. The wake is aerodynamically disadvantageous causing drag and increased fuel consumption especially at higher cruising speeds. This heretofore unavoidable wake is the reason visibly streamlined road cars have heretofore exhibited only small drag advantages over properly designed vehicles with bluff or abrupt tails.

Some vehicles have used wing-like airfoils as turning vanes to assist in directing external flow to reduce the adverse pressure gradients. However, the mass flow of air moved by these add-on devices never comes close to filling the large wake behind a body proportioned like a normal road vehicle. Therefore, the effect is helpful but minor.

There have been suggestions that the application of powered suction at discrete locations near the rear of a vehicle might provide a method for achieving wake reduction. However, wind tunnel studies show that the power required by such suction systems rivals the amount needed to power the original standard vehicle and therefore does not accomplish the overall result of reducing the total energy requirement of the vehicle. If a method could be found to reduce the energy required to move a poor slenderness ratio body through the air by providing means to maintain attached flow in the areas of adverse pressure gradients, the reduced energy requirement would translate directly into reduced fuel consumption.

As reported in NACA Research Memorandum, A8F21 entitled "An Experimental Investigation of a Large Scale of Several Configurations of a NACA Submerged Air Intake", published 19 Oct., 1948, devices are known for generating strong vorticity by passing flow over the sharp corners of the intersections between channel walls and a reference body surface adjacent an inlet ramp surface. Typically, NACA inlets have a ramp surface of generally V-shape which extends to an inlet duct lip thereabove and is bounded on the opposite sides by reflexed sidewalls extending upwardly to the body surface at approximately 90°. However, since all NACA inlets are intended to be inlets for rectangular cross-section intake ducts, their sidewalls must become parallel to the connecting duct sidewalls, hence the reflex and inlet duct lip must be carefully designed. The inlet lip forms the beginning of a fourth wall for the duct at the location of flow entry into the vehicle. The planform of a NACA inlet is always defined by the chosen ramp angle, that is, the included angle between the flat ramp floor and the body's external body surface. The length of the NACA inlet is always a direct result of that choice of angle. This grossly reduces the design choices available, especially when it is desired to reduce the aerodynamic drag of a body having a poor slenderness ratio.

The NACA inlets were designed to be located in regions of positive pressure since their purpose is to take air on board a vehicle, either to provide combustion air to an engine, flow to a heat exchanger or simply provide ventilation. NACA inlets are known to perform poorly in regions of great negative static pressure. NACA inlets are never used for the purpose of influencing external flow conditions on a basic body, other than to take in air and have never been used for the purpose of achieving aerodynamic drag reduction for a body passing through a flowing medium.

Therefore, even though various types of devices are known which produce vortices, none are effective in assuring attached flow in an adverse pressure gradient region with low drag.

BRIEF DESCRIPTION OF THE PRESENT INVENTION

Generally, the present invention is embodied in one or more three-sided submerged channels in a flow-control surface. Each channel includes two divergent walls forming a generally V-shaped ramp therebetween sloped so the channel widens and deepens toward downstream flow. The intersection between the flow-control surface adjacent the channels and the divergent wall preferably has a sharp radius of near 90° to generate strong vortices which rotate toward each other. The vortices energize the flow in the channel maintaining flow attachment to the ramp thereof and also maintaining flow attachment to the flow-control surface upstream and beside the channel. The channel itself is aligned generally with the direction of local flow in front of the V-point thereof and to function most efficiently, the front of the channel should be at least adjacent a region where attached flow would exist if the channel was not present. The exit of the channel or the last channel when multiple channels are placed in series, preferably is positioned at or near the rearmost edge of the flow-control surface to release the flow at a revised height or width and thereby effect a reduction in wake cross-section area.

The channels are very effective when used in series cascade with the last channel in the cascade ending at the trailing edge of the flow-control surface. The present invention assures boundary layer control on the flow-control surface through simple thinning of the boundary layer with dynamic turbulent mixing between vortices, boundary layer, and the free-stream fluid constrained within the submerged channels to prevent adverse drag.

As is known, there is a tendency of a fluid to form a strong vortex when caused to flow over a sharp edge at an appropriate angle. This phenomenon is seen along the sharp leading edges of delta wings at high angles of attack. In the present invention, the submerged channels have a nominally triangular planform shape permanently formed into the flow-control surface. These channels have sharp upper edges for effective vortex formation, divergent sidewalls essentially normal to the flow-control surface, and floor contours arranged to immediately conduct the streamwise vortices below the level of the local flow control surface. When the submerged channels are nested together in a proper overlapping manner, creating a streamwise cascade, new vortices can be generated downstream as often as required to replace vortices generated upstream which are about to burst and degenerate because of a strong adverse pressure gradient.

Vortex bursting is characterized by a sudden and pronounced increase in vortex diameter followed by disintegration and decay. This natural phenomenon normally would occur downstream of the flow-control surface's trailing edge. However, as the amount of adverse pressure gradient is increased, the location of vortex bursting moves forward until it coincides with a trailing edge. At this stage, the maximum effect of the invention is realized. Any further increase in adverse pressure gradient simply drives the vortex bursting location farther forward toward the vortex source and causes flow separation upstream of the trailing edge. As a consequence, and because pressure recovery requirements are frequently most severe toward the trailing edge of a flow-control surface, cascading the submerged channels of the present invention is a very effective way to utilize the invention when extreme adverse pressure gradients are encountered, such as, at the rear of a roadable vehicle, the aerodynamic tunnel of a ground-effects race car or the aft fuselage of a rear loading cargo aircraft.

It is therefore an object of the present invention to provide means which can prevent flow separation from a flow-control surface, such as a wing, flap, propeller, windmill blade, airfoil, fan, rotor, stator, inlet, diffuser or the inside radius of bends in pipes, ducts and engine ports.

Another object is to provide means to facilitate aggressive boat-tailing at the rear of a poor slenderness ratio body such as a commonly shaped automobile, aircraft, golf driver club, or boat where considerations such as interior volume and restricted length make effective rear end streamlining impossible.

Another object is to provide means for eliminating the need for long tapered streamlined tails on vehicles while decreasing the drag of the vehicle and thereby eliminating the attendant penalties of length, weight and wetted area of streamlined tails.

Another object is to provide means which are relatively easy to design and manufacture for maintaining attached flow to a flow-control surface in regions of adverse pressure gradients.

Another object is to provide low drag means for controlling flow separation.

Another object is to provide means for reducing aerodynamic drag of bodies immersed in a flowing medium when such bodies have poor slenderness ratios.

Another object of the present invention is to provide an aerodynamic improvement for application to a conventional land vehicle which is versatile enough to be blended into various styling themes and therefore provide a pleasing appearance as well as an increased efficiency for the vehicle.

DETAILED DESCRIPTION OF THE SHOWN EMBODIMENTS

Figures 1, 2:
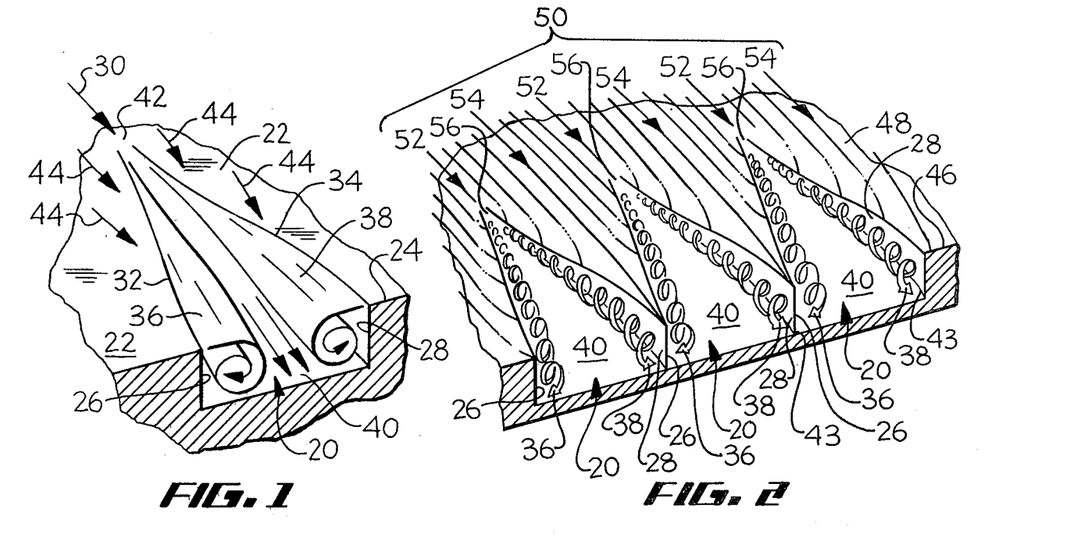
FIG. 1 is a perspective view of a single submerged channel constructed according to the present invention showing the vortices formed thereby.
FIG. 2 is a perspective view of submerged channels embedded in a flow-control surface constructed according to the present invention including indications of the fluid flow thereabout.

Referring to the drawings more particularly by reference numbers, number 20 in FIG. 1 refers to a boundary layer control channel 20 constructed according to the present invention submerged in the flow-control surface 22 of a body 24. The channel 20 includes a pair of sidewalls 26 and 28 which are generally perpendicular to the surface 22 and converge toward each other as they progress upstream to the flow of fluid medium 30. The sidewalls 26 and 28 form relatively sharp edges 32 and 34 respectively, with the surface 22 for generating a pair of counter-rotating vortices 36 and 38 from the flow 30 which passes thereover. The channel 20 is bounded at its bottom by a lower triangular surface 40 which in cross-section is generally parallel to the surface 22, but in length extends from beneath the flow-control surface 22 upwardly to a point of intersection 42 therewith at the upstream end of the walls 26 and 28. The intersections 43 between the sidewalls 26 and 28 and the floor surface 40 are shown with sharp radii but radii up to the radii of the local radii of the adjacent vortex 36 or 38 can be used. As shown, the edges 32 and 34 have an ogee shape and the height of the walls 26 and 28 at any location therealong and hence the distance the lower surface 40 is from the surface 22 at any point is designed so that the vortices 36 and 38 preferably are completely submerged within the channel 20 to prevent drag. As can be seen from the flow arrows 44, the vortices 36 and 38 tend to thin the boundary layer keeping attached flow on the surface 22 and on the floor surface 40 of the channel 20.

A different visualization of this process is shown in FIG. 2, wherein a plurality of channels 20 are provided submerged in a body 46. The vortices 36 and 38 of opposite rotations, vortex 36 rotating clockwise and vortex 38 rotating counterclockwise as viewed to the upstream, are formed by drawing flowing fluid from the lowest portion of the boundary layer of the flow-control surface 48. This causes the boundary layer to thin as the flow follows the streamlines indicated by the arrows 50 which generally curve into the channels 20. An increase in space between adjacent streamlines as the flow progresses downstream indicates a thinning of the boundary layer which protects against flow separation such as might be caused by regional adverse pressure gradients. The streamlines indicated by the arrows 52 and 54 do not curve because of their symmetrical position with respect to the apices 56 of the channels 20 in the case of arrows 52, their symmetry between adjacent channels 20 in the case of arrows 54. If the channels 20 are to be divided by an aerodynamic fence, not shown, it should be run along the length of arrows 52 or 54.

The vortices 36 and 38 travel downstream within the channels 20 adjacent the channel walls 26 and 28 effecting boundary layer control on the channel walls 26 and 28 and the floor surfaces 40 through dynamic turbulent mixing. The local flow velocity on the channel floor surface 40 is maintained at a very high percentage of free-stream velocity and the flow is well protected against incipient separation.

Although streamwise vortices have a low rate of viscous decay, they are subject to a natural mechanism of breakdown that begins with an abrupt bursting or expansion of the vortex diameter, after which the vortex is no longer effective in terms of boundary layer control. As explained previously, the actual location of this bursting point is dependent upon the regional adverse pressure gradient. If the adverse pressure gradient is large enough, it is possible to burst the vortices 36 and 38 soon after they are formed within the channels 20.

Figure 3:
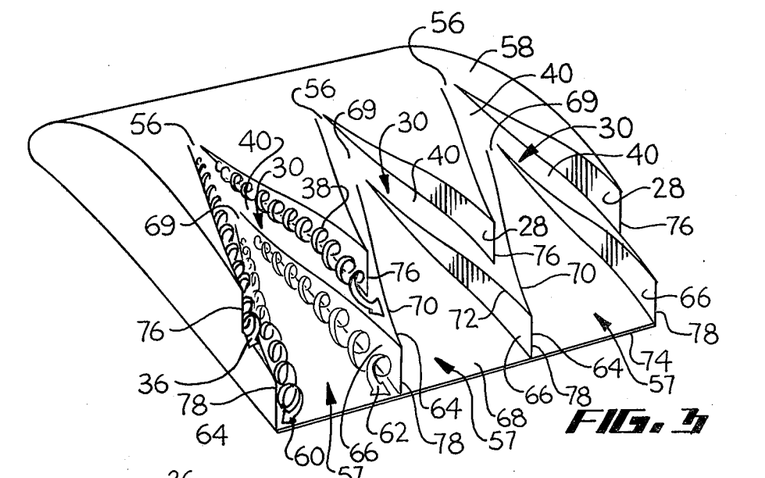
FIG. 3 is a perspective view of a wing segment including a spanwise array of submerged channels nested in cascade which are constructed according to the present invention.

As shown in FIG. 3, it is possible to nest one or more similar channels 57 within the channels 30, thereby forming a flow-wise cascade in an airfoil segment 58 to counteract any tendency for the vortices to burst. With this nested geometry, discrete new streamwise vortices 60 and 62 are generated from fluid drawn off the floor surface 40 of the preceeding channel 30. The general flow streamlines are analogous to those shown in FIGS. 1 and 2. These freshly generated vortices 60 and 62 are usually as strong as the original vortices 36 and 38. They effect boundary layer control further downstream because they are formed farther aft and therefore can resist bursting further aft along the airfoil segment 58. The channels 57 have sidewalls 64 and 66 similar to sidewalls 26 and 28, floor surfaces 68 which intersect the floor surfaces 40 of the channels 30 at their apices 69, and edges 70 and 72 similar to the edges 32 and 34.

Figure 4:
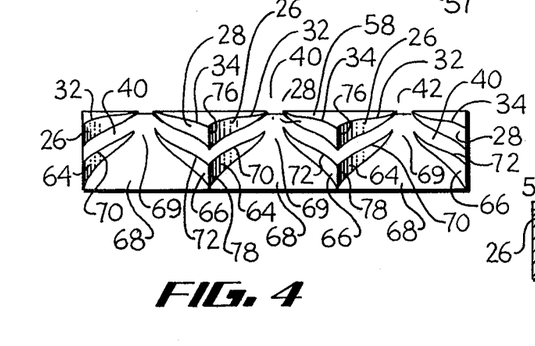
FIG. 4 is a rear view of the wing segment in FIG. 3.
Figure 5:
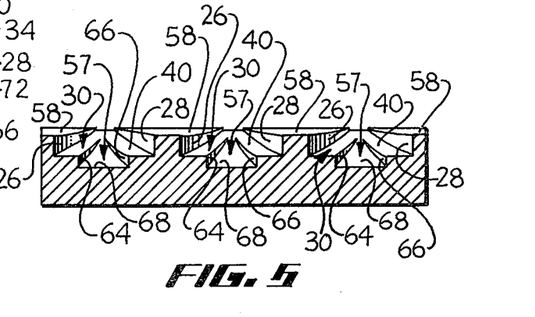
FIG. 5 is a typical spanwise cross-sectional view of the wing segment of FIG. 3.

This can be further visualized by reference to FIGS. 4 and 5. The cascade concept shown in FIGS. 3, 4 and 5 is particularly useful because the vortices 60 and 62 in the downstream channels 57 maintain full boundary layer control effectiveness even if the previously generated vortices 36 and 38 were subject to bursting as far forward of the trailing edge 74 of the airfoil segment 58 as the aft terminii 76 of the sidewalls 26 and 28. It should be noted, that the aft termini 76 of the walls 26 and 28 are relatively sharp and streamlined for a low drag release of the vortices 36 and 38 formed adjacent thereto. To be most effective in preventing vortex bursting and the large drag penalty associated therewith, it is preferable that the aft termini 78 of the walls 64 and 66 of the last channels 57 in the cascade be at or closely adjacent the trailing edge 74. Of course, this is not required when a negative pressure gradient sufficient to cause the vortices 60 and 62 to burst will never be present at the trailing edge 74 under the expected operating conditions.

Figure 6:
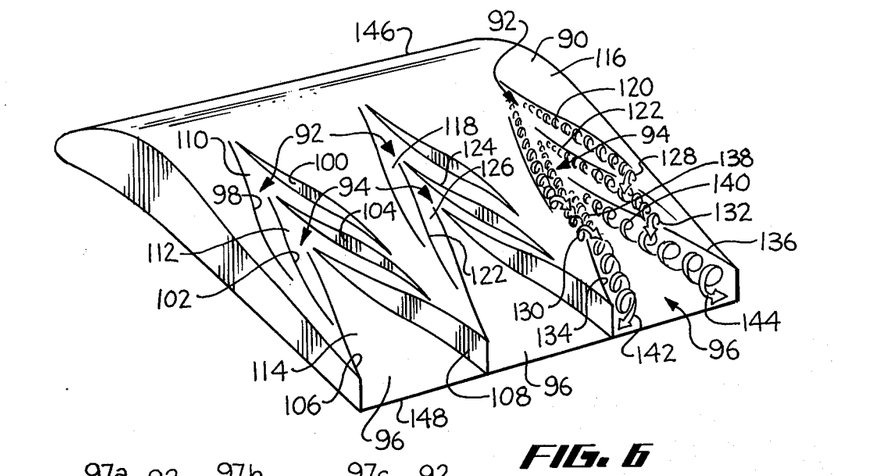
FIG. 6 is a perspective view of an airfoil constructed with an alternate form of the submerged channels of the present invention nested in cascade.
Figures 7, 8, 9, 10:
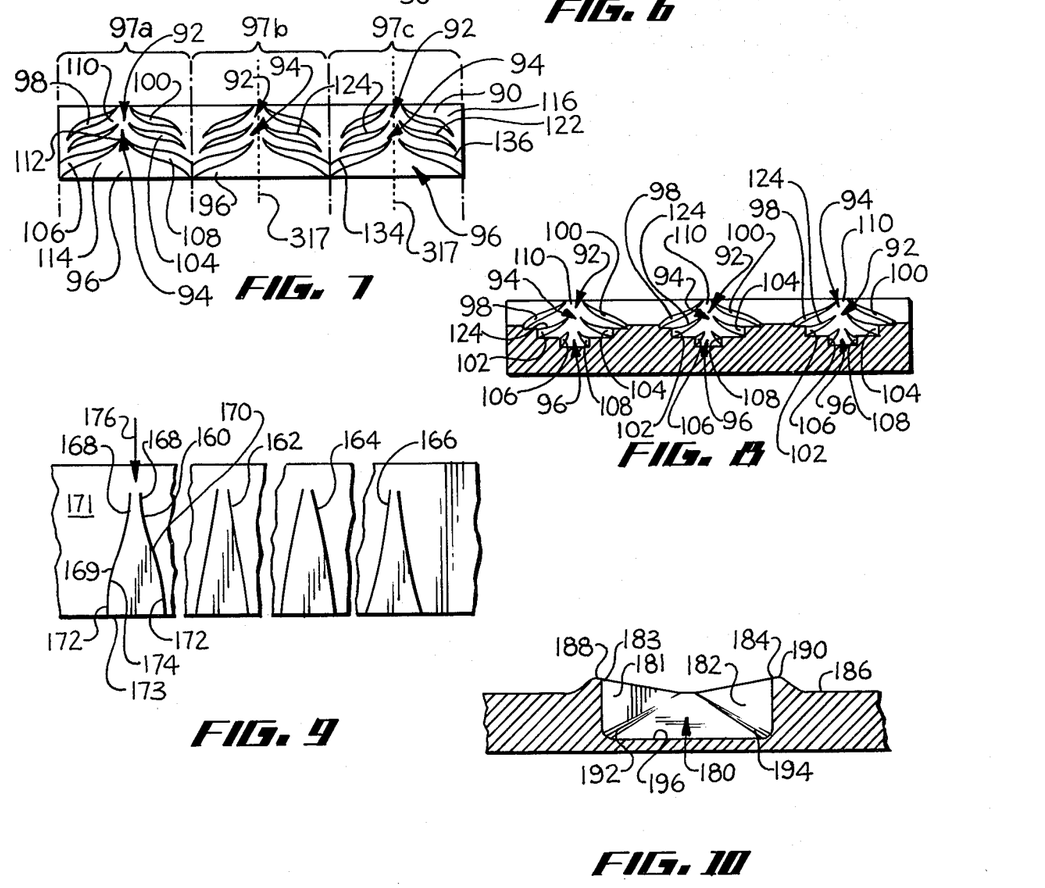
FIG. 7 is a rear view of the airfoil of FIG. 6.
FIG. 8 is a typical spanwise cross-sectional view of the airfoil of FIGS. 6 and 7.
FIG. 9 is a diagram of typical planform shapes for submerged channels constructed according to the present invention.
FIG. 10 is a lateral cross-section of an alternate form of the invention having lips that protrude into the boundary layer.

In FIGS. 6, 7 and 8, an alternate form of submerged vortex generating channels nested in cascade is shown in connection with an airfoil segment 90. In the form illustrated, three channels 92, 94 and 96 are positioned in each cascade 97a, 97b or 97c with each channel 92, 94 and 96 having sidewalls 98 and 100, 102 and 104 and 106 and 108 and floor surfaces 110, 112 and 114 respectively. The channels 92, 94 and 96 are similar to channels 20 and 57, except that the floor surfaces 110 and 112 are reenterant with the flow control surface 116. This arrangement of the floor surfaces 110, 112 and 114 has proved to function at least as well as the embodiment shown in FIGS. 3 through 5 and offers possible advantages in areas such as structural integrity, manufacturing cost, and asthetics.

There is a well known tendency for adjacent streamwise vortices of the same sign of rotation to join and roll into a single vortex sheet. This form of the invention uses that tendency to good effect. The vortices 118 and 120 of the channel 92, tend to roll over the adjacent edges 122 and 124 of the adjacent channel 94 to join with the vortices 126 and 128 generated thereby and to form combined vortices 130 and 132. In so doing the vortices 118 and 120 do not stick up into the adjacent flow field to cause undue drag. The vortices 130 and 132 likewise have a tendency to roll over the adjacent edges 134 and 136 respectively of the channel 96 to combine with the vortices 138 and 140 generated thereby and to form combined vortices 142 and 144. Although this is shown for the case of three channels 92, 94 and 96, it can be repeated as often as desired to extend the benefits of boundary layer control from the leading edge 146 to the trailing edge 148 of the airfoil segment 90, should such be necessary.

The nominal included planform angle between the divergent walls 26 and 28, 64 and 66, 98 and 100, 102 and 104 or 106 and 108 should be near 30° although generally good results are obtainable between 15 and 45 degrees. At narrower included angles, vortex formation is strong but the vortices within a particular channel tend to touch and because they are rotating in opposite directions one may roll above the other in an asymmetric manner extending into the surrounding flow and causing drag and unstable performance. Conversely, when the included angles are too wide, vortex formation tends to be weak leading to potentially premature vortex bursting.

Since the flow-control surface 22, 48 or 116 and the channel floor surface 40, 68, 110, 112 or 114 may be highly cambered from front to rear, it is not appropriate to refer to a simple angle between the channel floor surface 40 and the flow-control surface thereabout. However, the channel floor contour is fundamentally important because the rate of expansion of channel volume must not be so great as to cause flow separation within the channel. Therefore, abrupt changes in depth or cross-sectional areas of the channel 20, 57, 92, 94 or 96 are to be avoided. As a guide to contouring the channel floor the local depth at any channel station should not be made greater than half the local planform width because two rolled up sheet vortices must be accommodated side-by-side within the confines of the channel. Said another way, the minimum cross-section aspect ratio (width$_2$/area) is approximately 2. In general, cross-section aspect ratios of 3 and above provide excellent protection from choosing a floor contour so radical as to cause flow separation in the channel itself.

As will be discussed hereinafter, the walls 26 and 28, 64 and 66, 98 and 100, 102 and 104, or 106 and 108 need not be at right angles to either the flow-control surface or the channel floor. Therefore, when the channels are to be stamped or molded, very large draft angles are tolerable. It is also acceptable to radius the intersections such as intersections 43, of the channel walls and floor with radii no larger than the outer radius of the local vortex.

FIGS. 6, 7 and 8 illustrate a specific example of a modified Liebeck airfoil segment 90 which was tested in a wind tunnel. The particular modified Liebeck airfoil section was chosen for the airfoil segment 90 because of its known high-lift and low-drag characteristics. A 10" chord, 16" span wing without end plates was suspended at the center of the wind tunnel and tested at 38 ft/sec. wind speed. The low Reynolds number of 200,000 was chosen because of an interest in a high-performance windmill blade application. To insure satisfactory vortex formation at air speeds as low as 15 mph, each channel was made 6" in length. The modified wing was built with five span-wise rows, each containing six submerged vortex generating channels nested in streamwise cascade similar to that shown in FIG. 6. The clean wing yielded a maximum 3-D lift coefficient of 1.03 at an angle of attack of 16°. The wing modified with the present invention developed a maximum 3-D lift coefficient of 1.48 at an angle of attack of 26°. This is a very high three-dimensional lift coefficient considering the test wing's aspect ratio was only 1.6.

At lower angles of attack where neither wing experienced detectable flow separation, the modified wing exhibited a lift/drag advantage ranging from 14% greater lift at equal drag, to 20% less drag at equal lift. The 99% boundary layer, is the thickness of the boundary layer at which the relative velocity between the surface and the fluid is 99% of that of free-stream. At the trailing edge of the unmodified wing the 99% boundary layer was 0.62" thick. However, along the modified wings trailing edge, the 99% boundary layer was only 0.03" thick. Therefore, the tests showed that effective delay of flow separation by thinning the boundary layer can be achieved with the present invention without the drag increment normally associated with the prior art devices.

FIG. 9 illustrates several typical planform contours useful with the present invention, including an ogee contour 160, a straight triangular contour 162, a convex triangular contour 164 and a concave triangular contour 166. The contours 160, 162, 164 and 166 are only typical of possible shapes. However, the ogee contour 160 seems to have advantages in that the forward portions 168 of its sidewalls 169 and 170 fair easily into the adjacent surface 171, the trailing portions 172 of the sidewalls 169 and 170 fairs into an adjacent channel or the trailing edge 173 at a very small included terminus angle, and its center portion 174 has a sufficent angle with respect to the normal flow direction, as indicated by the arrow 176, or flows off angle therefrom, to produce the strong vortices desired.

In FIG. 10, a channel 180 is shown whose sidewalls 181 and 182 upper edges 183 and 184 are in the form of upwardly extending lips which protrude above the adjacent flow-control surface 186. Such lip structures even with the rounded edge cross-sections 188 and 190 tend to have greater drag than fully submerged and sharp geometries. Nevertheless, they are quite functional for use when structural or molding considerations do not allow sharp edges, like edges 32 and 34 of the preferred cross-section. As shown, the intersection 192 and 194 of the sidewalls 181 and 182 with the floor surface 196 is also rounded. As aforesaid, this does not adversely affect the performance of the channel 180 so long as the intersection 192 and 194 do not extend more than halfway up the walls 181 and 182.

Figure 11:
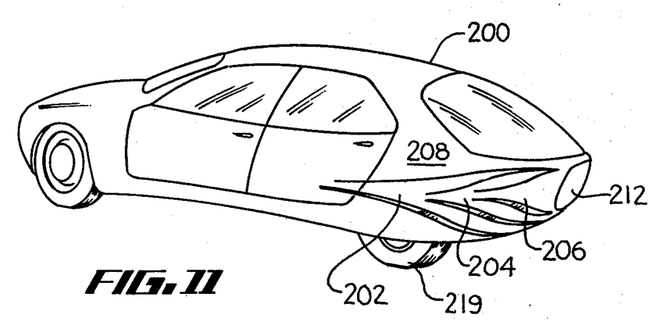
FIG. 11 is a perspective view of a roadable automobile showing the application of the present invention to maintain attached flow and thereby eliminate flow separation from the rear thereof.
Figure 12:
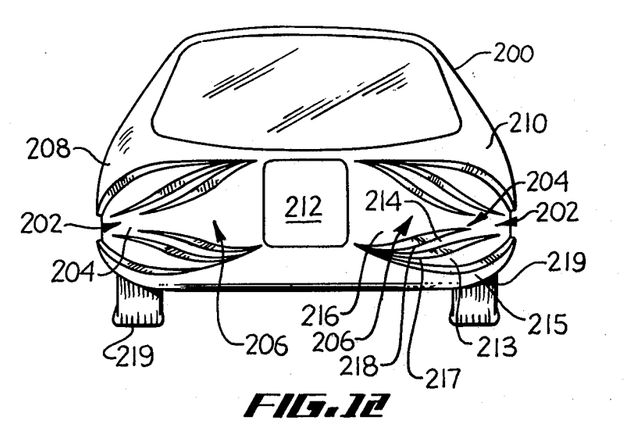
FIG. 12 is a rear view of the automobile of FIG. 11.
Figure 13:
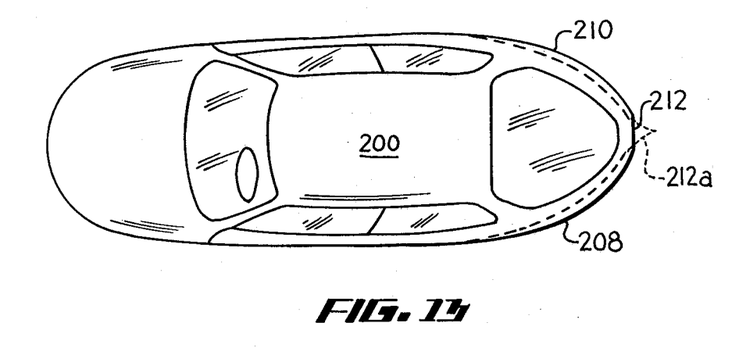
FIG. 13 is a top plan view of the automobile of FIGS. 11 and 12.

A practical example of the present invention's ability to maintain attached flow in an extreme adverse pressure gradient situation is shown in FIGS. 11 through 13. FIG. 11 is a perspective view of a detailed 1/10th scale wind tunnel model, 200 of a Gas Camel automobile (trademark of Daniel S. Gurney, Newport Beach, Ca.) employing the present invention in the form of channels 202, 204 and 206 on the opposite sides of the model. The channels 202, 204 and 206 which are similar to the channels 92, 94 and 96 of FIG. 6, are positioned on the opposite rear fenders 208 and 210 of the model 200, in order to permit radical "boat-tailing". In this instance, the choice of size for the channels 202, 204 and 206 was largely one of asthetics, they in fact being large enough to generate vorticity below 5 mph on a full-sized car. The radical extent of the "boat-tailing" accomplished in just 3' of scale rear-axle overhang is shown in FIG. 13. Upon reaching the rear license plate area 212 of the model 200, the flow on each side of the model is turned through 65°. Although it is difficult to see, the floor surfaces 213 and 214 of the channels 202 and 204 are not parallel to the flow-control surface 215 thereabout or the floor surface 216 of the channel 206. The angle chosen tilts the edges 217 and 218 of the channels 204 and 206 upwardly into the 3-D airstream in channels 202 and 204 to assure vortex formation. This is especially important in the lower half of the channels behind the rear wheels 219 which disturb the flow and make vortex formation difficult.

Wind tunnel tests at a Reynolds number of 600,000 verified the maintenance of fully attached flow to the rear area 212 of the model 200. Since the rear area 212 had an area reduced to little more than the cross-sectional area of a rear license plate, there was a large reduction in the wake of separated flow behind the model 200. If the flat rear license plate area 212 was not legally required, the opposite rear fenders 208 and 210 could have been merged together in the form of a tiny stinger 212a as shown in dotted outline in FIG. 13, for still lower drag.

The model 200 as pictured, yielded a drag coefficient $C_D = 0.157$ when no air gaps were present between the tires and the ground plane. For comparison, when the channels 202, 204 and 206 were filled in and faired so as to be removed, the drag of the model 200 rose nearly 30% to $C_D = 0.203$. The model 200 with the channels 202, 204 and 206 was yawed up to 40° in the wind tunnel without provoking flow separation on the downwind flank. This presented the interesting spectacle of flow on the downwind side of the yawed model 200 leaving the rear 212 in a direction that was literally 15° upstream.

When a duplicate model without the channels 202, 204 and 206 was given a long tapered tail in an attempt to equal the low drag achieved by the channels 202, 204 and 206, a rear axle scale overhang of 5' was required to provide sufficient pressure recovery zone length for attached flow to be maintained to the same size rear area 212. However, the boundary layer was quite thick and the best $C_D$ that could be obtained was 0.162 making it appear that the conventionally streamlined, long-tailed model could not be made to equal the low drag of the model 200. Furthermore, 20° of yaw angle would provoke flow separation on the downwind side of the long tail indicating comparatively poor aerodynamic stability in cross winds. These tests show that in some instances, the drag increment of the present invention may be less than the viscous friction that would exist on the long flow-control surface which they can replace. This would suggest applications in the aircraft industry where it may be possible to better the drag performance and reduce fuselage tail structure and weight by using the present invention.

In full-scale tests, using a stock 1980 Volkswagon diesel pickup truck, a camper shell was constructed with an array of individual channels 30, as shown in FIG. 2, which commenced at the shell's upper sufface immediately behind the truck's roof. The upper surface of the shell was then curved downward 30° over the bed of the truck to terminate at tailgate height. Tufts verified the flow was attached at all surfaces. Despite a severe induced drag penalty due to lift, the $C_D$ fell from the 0.49 of a stock truck and the 0.47 of a commercially available streamlined fiberglass shell to 0.42, allowing the otherwise stock truck to give over 60 mpg in steady state cruise at 55 mph. The unwanted lift and drag increment, which in this case arose from the use of an upper surface for boat-tailing, could have been avoided by simply utilizing flow control surfaces of aerodynamic symmetry, such as the rear fenders 208 and 210, shown in FIGS., 11, 12 and 13.

Figure 14:
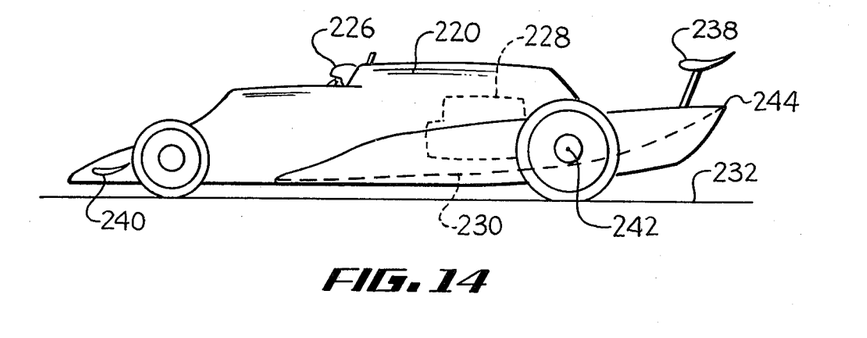
FIG. 14 is a side view of a ground effects race car.
Figure 15:
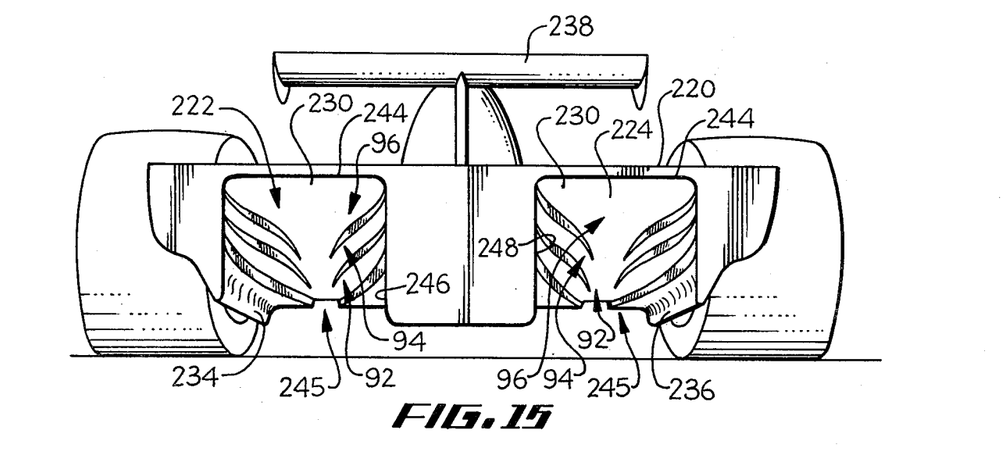
FIG. 15 is a rear view of the race car of FIG. 14 showing the application of the present invention to the ground effect tunnels thereof.

Although side-by-side cascades of channels have been shown herein, there are some applications where endplates positioned along the streamlines indicated by the arrows 54 or 52 can be used. FIGS. 14 and 15 illustrate such a case wherein a ground effects race car 220 is pictured. Such cars 220 use aerodynamic tunnels 222 and 224 positioned on each side of the driver 226 and the engine 228. Each tunnel has a top surface 230 contoured away from the road surface 232 to generate low static pressures underneath the car 220 between two sidewalls 234 and 236. The top surfaces 230 of the tunnels 222 and 224 act as flow control surfaces which face the road surface 232 and their effect is to improve the tire to road adhesion in much the same manner as also is achieved by the use of inverted airfoils 238 and 240.

The flow through the tunnels 222 and 224 is subject to pressure gradients so severe that heretofore separation inevitably occurred near the rear axle 242. This prevented predictable flow from reaching the trailing edge 244 of the tunnel ceiling surface 230, thereby creating a large drag wake and less down-force than was desired requiring the use of the rear auxillary wing 238 with its attendant further increase in drag of the car 220. The vortex generators of the prior art have been tried in the tunnels 222 and 224 in almost every conceivable arrangement with such poor results that they now are seldom seen.

FIGS. 14 and 15 are views of an actual 1/10th scale wind tunnel model of the 1982 Indianapolis Eagle planned to be manufactured by All American Racers, Inc. of Santa Ana, Ca. The model included the channels 92, 94 and 96, shown in FIG. 6, with one cascade 245 in each tunnel 222 and 224, the end plates 234 and 236 acting as outer edge end plates for the cascades 245 and the engine and transmission fairing sidewalls 246 and 248 acting as inner edge end plates. The model of the car 220 was tested with and without the channels 92, 94 and 96. Regardless of the ride height, the model without the channels, 92, 94 and 96 suffered flow separation from the ceilings of the tunnels near the area of the rear axle 242. The flow exited the tunnels in a discrete stream positioned midway between the ground surface and the trailing edge of the tunnels. When the model of the car 220 was equipped with the channels, 92, 94 and 96, tufting and local total head readings showed fully attached flow had been established over the entire lengths of the tunnels 222 and 224. The result was that the downforce increased over 25%, while the downforce to drag ratio was improved 7%, meaning that a car built like the model with less horsepower will be faster both in the corners and on the straightaways if the present invention is included therein.

Figure 16:
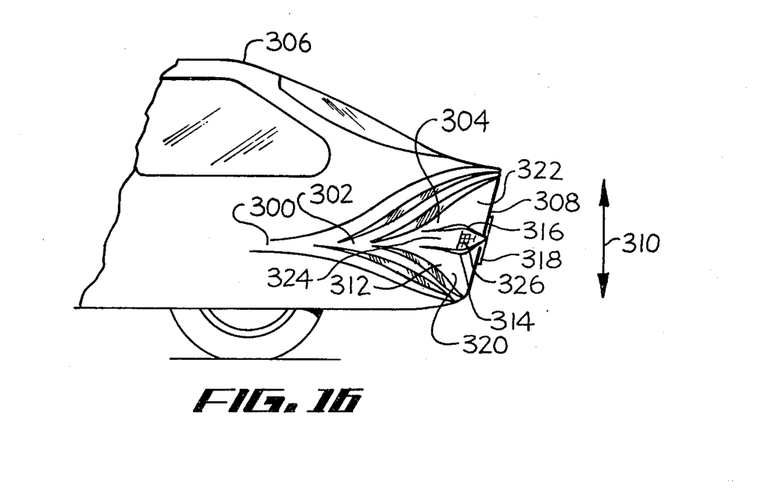
FIG. 16 is a side elevational view of the rear fender area of a production automobile with the present invention incorporated therein.

In FIG. 16, channels 300, 302 and 304 similar to the channels 202, 204 and 206 in FIGS. 11 through 13 are shown applied to modify an existing car 306 whose rear end 308 exists with an unfavorable height 310 so that as the channels 300, 302 and 304 camber around the rear end 308, the floor surface 312 of the last channel 304 must become unacceptably wide. To assure that separation does not occur on the floor 312 a pair of walls 314 and 316, similar to those shown between the dotted lines 317 in FIG. 7, are employed to generate vortices and prevent flow separation adjacent the sides of the license plate area 318 thereof. The effect is the creation of two half channels 320 and 322 like half of channel 96 of FIGS. 6, 7 and 8. The protruberance 324 out of the floor surface 312 formed by the two walls 314 and 316 can be blended into the styling of the car 306 and provides a convenient place to position tail lights 326.

Thus there has been shown and described vortex generating, flow separation preventing channels which can be used in numerous ways to improve the lift and drag characteristics of flow-control surfaces subjected to adverse pressure gradients or to eliminate surface structure otherwise required to avoid adverse pressure gradients, which fulfill all the objects and advantages sought therefore. Many changes, modifications, variations and other uses and applications of the subject channels will become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. Means to maintain flow of a flowing medium attached to the exterior of a flow control member having a flow control surface, said means including:
   a first generally triangularly shaped channel submerged in the flow control surface, said triangularly shaped channel having:
      an apex portion facing the flow of the flowing medium;
      an end portion positioned downstream in the flow of flowing medium from said apex portion;
      a floor surface extending from the flow control surface at said apex portion to said end portion;
      a first sidewall extending between the flow control surface and said floor surface and extending between said apex portion and said end portion, said first sidewall forming a first sidewall edge between said first sidewall and the flow control surface, said first sidewall edge having a forward portion, a rearward portion, and a central portion, said first sidewall central portion being positioned out of alignment with the flow of the flowing medium; and
      a second sidewall extending between the flow control surface and said floor surface and extending between said apex portion and said end portion, said second sidewall forming a second sidewall edge between said second sidewall and the flow control surface, said second sidewall edge having a forward portion, a rearward portion, and a central portion, said second sidewall central portion being positioned out of alignment with the flow of the flowing medium, whereby first and second counterrotating vortices form over said first and second sidewall edges in said first channel which thin the boundry layer of the flow of flowing medium at the adjacent flow control surface and provide turbulent mixing within said first channel so that the flow of flowing medium remains attached to the flow control surface and said floor surface.

2. The means to maintain attached flow as defined in claim 1 further including:
   a first intersection between said first sidewall and said floor surface; and
   a second intersection between said second sidewall and said floor surface, said first and second intersections having local radii not greater than one half the local elevation distance from said floor surface to the flow control surface.

3. The means to maintain attached flow as defined in claim 1 further including:
   a second generally triangularly shaped channel submerged in the flow control surface, said second triangularly shaped channel having:
      a second channel apex portion facing the flow of the flowing medium;
      a second channel end portion positioned downstream in the flow of flowing medium from said second channel apex portion;
      a second channel floor surface extending from the flow control surface at said second channel apex portion to said end portion;
      a second channel first sidewall extending between the flow control surface and said second channel floor surface and extending between said second channel apex portion and said second channel end portion, said second channel first sidewall forming a second channel first sidewall edge between said second channel first sidewall and the flow control surface, said second channel first sidewall edge having a forward portion, a rearward portion, and a central portion, said second channel first sidewall central portion being positioned out of alignment with the flow of the flowing medium, said second channel first sidewall intersecting said second sidewall of said first channel adjacent said floor surfaces of said first and second channels; and a second channel second sidewall extending between the flow control surface and said second channel floor surface and extending between said second channel apex portion and said second channel end portion, said second channel second sidewall forming a second channel second sidewall edge between said second channel second sidewall and the flow control surface, said second channel second sidewall edge having a forward portion, a rearward portion, and a central portion, said second channel second sidewall central portion being positioned out of alignment with the flow of the flowing medium, whereby first and second counterrotating vortices form over said second channel first and second sidewall edges in said second channel which thin the boundry layer of the flow of flowing medium at the adjacent flow control surface and provide turbulent mixing within said second channel so that the flow of flowing medium remains attached to the flow control surface and said second channel floor surface.

4. The means to maintain attached flow as defined in claim 1 further including:

a second generally triangularly shaped channel submerged in said floor surface of said first channel, said second triangularly shaped channel having:

a second channel apex portion facing the flow of the flowing medium positioned downstream in the flow of flowing medium from said first channel apex portion;

a second channel end portion positioned downstream in the flow of flowing medium from said first channel end portion;

a second channel floor surface extending from said first channel floor surface at said second channel apex portion to said second channel end portion;

a second channel first sidewall extending between said first channel floor surface and said second channel floor surface and extending between said second channel apex portion and said second channel end portion, said second channel first sidewall forming a second channel first sidewall edge between said second channel first sidewall and said first channel floor surface, said second channel first sidewall edge having a forward portion, a rearward portion, and a central portion, said second channel first sidewall central portion being positioned out of alignment with the flow of the flowing medium; and a second channel second sidewall extending between said first channel floor surface and said second channel floor surface and extending between said second channel apex portion and said second channel end portion, said second channel second sidewall forming a second channel second sidewall edge between said second channel second sidewall and said first channel floor surface, said second channel second sidewall edge having a forward portion, a rearward portion, and a central portion, said second channel second sidewall central portion being positioned out of alignment with the flow of the flowing medium, whereby third and fourth counterrotating vortices form over said second channel first and second sidewall edges in said second channel which thin the boundry layer of the flow of flowing medium at the adjacent first channel floor surface and provide turbulent mixing within said second channel so that the flow of flowing medium remains attached to said first channel floor surface and said second channel floor surface.

5. The means to maintain attached flow as defined in claim 1 further including:

at least a last generally triangularly shaped channel positioned with respect to said first channel so that a plurality of similiar submerged generally triangularly shaped channels are formed in series from upstream to downstream in the flow of flowing medium and in the flow control surface, said last triangularly shaped channel having:

a last channel apex portion facing the flow of the flowing medium positioned downstream in the flow of flowing medium from said upstream adjacent channel apex portion;

a last channel end portion positioned downstream in the flow of flowing medium from said upstream adjacent channel end portion;

a last channel floor surface extending from said upstream adjacent channel floor surface at said last channel apex portion to said last channel end portion;

a last channel first sidewall extending between said upstream adjacent channel floor surface and said last channel floor surface and extending between said last channel apex portion and said last channel end portion, said last channel first sidewall forming a last channel first sidewall edge between said last channel first sidewall and said upstream adjacent channel floor surface, said last channel first sidewall edge having a forward portion, a rearward portion, and a central portion, said last channel first sidewall central portion being positioned out of alignment with the flow of the flowing medium; and a last channel second sidewall extending between said upstream adjacent channel floor surface and said last channel floor surface and extending between said last channel apex portion and said last channel end portion, said last channel second sidewall forming a last channel second sidewall edge between said last channel second sidewall and said upstream adjacent channel floor surface, said last channel second sidewall edge having a forward portion, a rearward portion, and a central portion, said last channel second sidewall central portion being positioned out of alignment with the flow of the flowing medium, whereby third and fourth counterrotating vortices form over said last channel first and second sidewall edges in said last channel which thin the boundry layer of the flow of flowing medium at the adjacent upstream adjacent channel floor surface and provide turbulent mixing within said last channel so that the flow of flowing medium remains attached to said upstream adjacent channel floor surface and said last channel floor surface.

6. The means to maintain attached flow as defined in claim 5 wherein the flow control surface has a trailing edge, said last channel second sidewall extending to the trailing edge of the flow control surface.

7. The means to maintain attached flow as defined in claim 6 wherein said last channel first sidewall extends to the trailing edge of the flow control surface.

8. The means to maintain attached flow as defined in claim 6 including:
a second series of said channels similiar to said first series of channels positioned with said last channel second sidewall of said first series intersecting said last channel first sidewall of said second series.

9. The means to maintain attached flow as defined in claim 5 wherein said last channel floor surface includes:
a first generally triangularly shaped protrusion extending from said last channel floor surface, said generally triangularly shaped protrusion having:
 a front portion facing the flow of the flowing medium;
 an apex portion positioned downstream in the flow of flowing medium from said front portion;
 a top surface extending from said last channel floor surface at said to said apex portion;
 a first sidewall extending between said last channel floor surface and said top surface and extending between said front portion and said apex portion, said first sidewall forming a first sidewall edge between said first sidewall and said top surface, at least a portion of said first sidewall being positioned at an angle to the flow of the flowing medium; and
 a second sidewall extending between said last channel floor surface and said top surface and extending between said front portion and said apex portion, said second sidewall forming a second sidewall edge between said second sidewall and said top surface, at least a portion of said second sidewall being positioned at an angle to the flow of the flowing medium, whereby fifth and sixth counterrotating vortices form over said first and second sidewall edges of said first generally triangularly shaped protrusion which thin the boundry layer of the flow of flowing medium at the adjacent top surface and provide turbulent mixing within said last channel so that the flow of flowing medium remains attached.

10. The means to maintain attached flow as defined in claim 1 wherein said first floor surface extends upwardly to intersect with the flow control surface adjacent said rear portion of said second sidewall edge.

11. The means to maintain attached flow as defined in claim 10 further including:
at least a last generally triangularly shaped channel positioned with respect to said first channel so that a plurality of similiar submerged generally triangularly shaped channels are formed in a first series from upstream to downstream in the flow of flowing medium and in the flow control surface, said last triangularly shaped channel having:
 a last channel apex portion facing the flow of the flowing medium positioned downstream in the flow of flowing medium from said upstream adjacent channel apex portion;
 a last channel end portion positioned downstream in the flow of flowing medium from said upstream adjacent channel end portion;
 a last channel floor surface extending from said upstream adjacent channel floor surface at said last channel apex portion to said last channel end portion submerged from the flow control surface;
 a last channel first sidewall extending between said upstream adjacent channel floor surface and said last channel floor surface and extending between said last channel apex portion and said last channel end portion, said last channel first sidewall forming a last channel first sidewall edge between said last channel first sidewall and said upstream adjacent channel floor surface, said last channel first sidewall edge having a forward portion, a rearward portion, and a central portion, said last channel first sidewall central portion being positioned out of alignment with the flow of the flowing medium; and
 a last channel second sidewall extending between said upstream adjacent channel floor surface and said last channel floor surface and extending between said last channel apex portion and said last channel end portion, said last channel second sidewall forming a last channel second sidewall edge between said last channel second sidewall and said upstream adjacent channel floor surface, said last channel second sidewall edge having a forward portion, a rearward portion, and a central portion, said last channel second sidewall central portion being positioned out of alignment with the flow of the flowing medium, whereby third and fourth counterrotating vortices form over said last channel first and second sidewall edges in said last channel which thin the boundry layer of the flow of flowing medium at the adjacent upstream adjacent channel floor surface and provide turbulent mixing within said last channel so that the flow of flowing medium remains attached to said upstream adjacent channel floor surface and said last channel floor surface.

12. The means to maintain attached flow as defined in claim 11 wherein the flow control surface has a trailing edge, said last channel second sidewall extending to the trailing edge of the flow control surface.

13. The means to maintain attached flow as defined in claim 12 including:
a second series of said channels similiar to said first series of channels positioned with said last channel second sidewall of said first series intersecting said last channel first sidewall of said second series.

14. The means to maintain attached flow as defined in claim 10 further including:
at least a last generally triangularly shaped channel positioned with respect to said first channel so that a plurality of similiar submerged generally triangularly shaped channels are formed in a first series from upstream to downstream in the flow of flowing medium and in the flow control surface, said last triangularly shaped channel having:
 a last channel apex portion facing the flow of the flowing medium positioned downstream in the flow of flowing medium from said upstream adjacent channel apex portion;

a last channel end portion positioned downstream in the flow of flowing medium from said upstream adjacent channel end portion;

a last channel floor surface extending from said upstream adjacent channel floor surface at said last channel apex portion to said last channel end portion at a point of intersection to the flow control surface;

a last channel first sidewall extending between said upstream adjacent channel floor surface and said last channel floor surface and extending between said last channel apex portion and said last channel end portion, said last channel first sidewall forming a last channel first sidewall edge between said last channel first sidewall and said upstream adjacent channel floor surface, said last channel first sidewall edge having a forward portion, a rearward portion, and a central portion, said last channel first sidewall central portion being positioned out of alignment with the flow of the flowing medium; and a last channel second sidewall extending between said upstream adjacent channel floor surface and said last channel floor surface and extending between said last channel apex portion and said last channel end portion, said last channel second sidewall forming a last channel second sidewall edge between said last channel second sidewall and said upstream adjacent channel floor surface, said last channel second sidewall edge having a forward portion, a rearward portion, and a central portion, said last channel second sidewall central portion being positioned out of alignment with the flow of the flowing medium, whereby third and fourth counterrotating vortices form over said last channel first and second sidewall edges in said last channel which thin the boundry layer of the flow of flowing medium at the adjacent upstream adjacent channel floor surface and provide turbulent mixing within said last channel so that the flow of flowing medium remains attached to said upstream adjacent channel floor surface and said last channel floor surface.

15. The means to maintain attached flow as defined in claim 14 wherein at least a portion of said first channel floor surface is positioned at an acute angle with respect the adjacent sidewall.

16. The means to maintain attached flow as defined in claim 1 wherein said first and second sidewall edges are relatively sharp edges.

17. The means to maintain attached flow as defined in claim 1 wherein said first and second sidewall edges form an ogee shape with the flow control surface.

18. The means to maintain attached flow as defined in claim 17 wherein said ogee shape of said first and second sidewall edges is so shaped as to maintain an angle of attack to the local flow of the flowing medium thereover at least at said central portions thereof.

19. The means to maintain attached flow as defined in claim 1 wherein said first channel includes:
a third sidewall extending from said first channel floor surface generally facing said first sidewall;
a fourth sidewall extending from said first channel floor surface generally facing said second sidewall and intersecting said third sidewall adjacent said first channel end portion; and
a roof surface extending from said first channel floor surface to said end portion of said first channel between said third and fourth sidewalls and forming third and fourth sidewall edges therewith, at least portions of which are positioned at an angle of attack with the local flow of the flowing medium whereby a series/parallel arrangement of at least three channels is formed.

20. The means to maintain attached flow as defined in claim 1 wherein said first and second sidewall edges extend above the adjacent flow control surface.

21. Means to maintain flow of a flowing medium attached to the exterior of a flow control member having a flow control surface by thinning the boundry layer thereof, said means including:
a first channel formed in the flow control surface, said first channel having:
a forward portion generally facing the flow of the flowing medium;
an end portion positioned downstream in the flow of flowing medium from said forward portion;
a floor surface extending from the flow control surface at said forward portion to said end portion; and
a first sidewall extending between the flow control surface and said floor surface and extending between said forward portion and said end portion, said first sidewall forming a first sidewall edge between said first sidewall and the flow control surface, said first sidewall edge having a forward portion, a rearward portion, and a central portion, said first sidewall central portion being positioned out of alignment with the flow of the flowing medium, whereby a first counterrotating vortex forms over said first sidewall edge in said first channel which thins the boundry layer of the flow of flowing medium at the adjacent flow control surface and provides turbulent mixing within said first channel so that the flow of flowing medium remains attached to the flow control surface and said floor surface.

22. The means to maintain attached flow as defined in claim 21 further including:
at least a last channel positioned with respect to said first channel so that a plurality of similiar submerged channels are formed in series from upstream to downstream in the flow of flowing medium and in the flow control surface, said last channel having:
a last channel forward portion generally facing the flow of the flowing medium positioned downstream in the flow of flowing medium from said upstream adjacent channel forward portion;
a last channel end portion positioned downstream in the flow of flowing medium from said upstream adjacent channel end portion;
a last channel floor surface extending from said upstream adjacent channel floor surface at said last channel forward portion to said last channel end portion; and
a last channel first sidewall extending between said upstream adjacent channel floor surface and said last channel floor surface and extending between said last channel forward portion and said last channel end portion, said last channel first sidewall forming a last channel first sidewall edge between said last channel first sidewall and said upstream adjacent channel floor surface, said last channel first sidewall edge having a forward portion, a rearward portion, and a central portion, said last channel first sidewall central portion being positioned out of alignment with the flow of the flowing medium, whereby a second counterrotating vortex forms over said last channel first edge in said last channel which thins the boundry layer of the flow of flowing medium at the adjacent upstream adjacent channel floor surface and provides turbulent mixing within said last channel so that the flow of flowing medium remains attached to said upstream adjacent channel floor surface and said last channel floor surface.

23. The means to maintain attached flow as defined in claim 22 further including:
a fence bounding the flow control surface generally parallel to said first and last channels, said first sidewalls and said floor surfaces of said first and last channels intersecting said fence at said end portions thereof.

24. The means to maintain attached flow as defined in claim 22 further including:
a fence bounding the flow control surface generally parallel to said first and last channels, said floor surfaces of said first and last channels intersecting said fence at said end portions thereof.

25. The means to maintain attached flow as defined in claim 22 wherein the flow control surface has a trailing edge, said last channel first sidewall extending to the trailing edge of the flow control surface.

26. The means to maintain attached flow as defined in claim 25 including:
a second series of said channels similiar and sidewardly reversed to said first series of channels positioned with said last channel first sidewall of said first series intersecting said last channel first sidewall of said second series.

27. The means to maintain attached flow as defined in claim 21 further including:
at least a last channel positioned with respect to said first channel so that a plurality of similiar submerged channels are formed in a first series from upstream to downstream in the flow of flowing medium and in the flow control surface, said last having:
a last channel forward portion generally facing the flow of the flowing medium positioned downstream in the flow of flowing medium from said upstream adjacent channel forward portion;
a last channel end portion positioned downstream in the flow of flowing medium from said upstream adjacent channel end portion;
a last channel floor surface extending from said upstream adjacent channel floor surface at said last channel forward portion to said last channel end portion submerged from the flow control surface; and
a last channel first sidewall extending between said upstream adjacent channel floor surface and said last channel floor surface and extending between said last channel forward portion and said last channel end portion, said last channel first sidewall forming a last channel first sidewall edge between said last channel first sidewall and said upstream adjacent channel floor surface, said last channel first sidewall edge having a forward portion, a rearward portion, and a central portion, said last channel first sidewall central portion being positioned out of alignment with the flow of the flowing medium, whereby a second counterrotating vortex forms over said last channel first sidewall edge in said last channel which thins the boundry layer of the flow of flowing medium at the adjacent upstream adjacent channel floor surface and provides turbulent mixing within said last channel so that the flow of flowing medium remains attached to said upstream adjacent channel floor surface and said last channel floor surface.

28. The means to maintain attached flow as defined in claim 27 wherein the flow control surface has a trailing edge, said last channel first sidewall extending to the trailing edge of the flow control surface.

29. The means to maintain attached flow as defined in claim 28 including:
a second series of channels similiar and sidewardly reversed to said first series of channels positioned with said last channel first sidewall of said first series of channels intersecting said last channel first sidewall of said second series of channels.

30. The means to maintain attached flow as defined in claim 21 wherein said first floor surface extends upwardly to intersection with the flow control surface at said forward portion, said means to maintain attached flow further including:
at least a last channel positioned with respect to said first channel so that a plurality of similiar submerged channels are formed in a first series from upstream to downstream in the flow of flowing medium and in the flow control surface, said last channel having:
a last channel forward portion generally facing the flow of the flowing medium positioned downstream in the flow of flowing medium from said upstream adjacent channel forward portion;
a last channel end portion positioned downstream in the flow of flowing medium from said upstream adjacent channel end portion;
a last channel floor surface extending from said upstream adjacent channel floor surface at said last channel forward portion to said last channel end portion at a point of intersection with the flow control surface; and
a last channel first sidewall extending between said upstream adjacent channel floor surface and said last channel floor surface and extending between said last channel forward portion and said last channel end portion, said last channel first sidewall forming a last channel first sidewall edge between said last channel first sidewall and said upstream adjacent channel floor surface, at least a portion of said last channel first sidewall edge being positioned at an angle to the flow of the flowing medium, whereby a second counterrotating vortex forms over said last channel first sidewall edge in said last channel which thins the boundry layer of the flow of flowing medium at the adjacent upstream adjacent channel floor surface and provides turbulent mixing within said last channel so that the flow of flowing medium remains attached to said upstream adjacent channel floor surface and said last channel floor surface.

31. The mean maintain attached flow as defined in claim 30 including:
a fence bounding the flow control surface generally parallel to said first and last channels, said floor surfaces of at least said first channel intersecting said fence at said end portions thereof.

32. The means to maintain attached flow as defined in claim 21 wherein said first flow surface extends upwardly to intersection with the flow control surface at said forward portion and said end portion of said first channel.

33. The means to maintain attached flow as defined in claim 21 wherein said first sidewall edge forms an ogee shape with the flow control surface, said ogee shape being so shaped as to maintain an angle of attack to the local flow of the flowing medium thereover at least at said central portion thereof.

34. The means to maintain attached flow as defined in claim 21 wherein at least a portion of said floor surface is positioned at an acute angle with respect to said first side wall.

35. The means to maintain attached flow as defined in claim 21 wherein said first channel includes:
 a second sidewall extending from said first channel floor surface generally facing said first sidewall;
 a third sidewall extending from said first channel floor surface generally facing away from said first sidewall and intersecting said second sidewall adjacent said first channel end portion; and
 a roof surface extending from said first channel floor surface to said end portion of said first channel between said second and third sidewalls and forming second and third sidewall edges therewith, at least portions of which are positioned at an angle of attack with the local flow of the flowing medium whereby a series/parallel arrangement of channels is formed.

36. The means to maintain attached flow as defined in claim 21 wherein said first channel includes:
 a fence bounding the flow control surface generally parallel to said first channel, said first sidewall intersecting said fence at said end portion.

37. A body having a usual direction of motion through a medium, a front, a rear, and rear side areas which rear side areas each include:
 a flow control surface;
 a first channel formed in said flow control surface, said first channel having:
  a forward portion generally facing the front;
  an end portion positioned closer to the rear than said forward portion;
  a floor surface extending from said flow control surface at said forward portion to said end portion; and
  a first sidewall extending between said flow control surface and said floor surface and extending between said forward portion and said end portion, said first sidewall forming a first sidewall edge between said first sidewall and said flow control surface, said first sidewall edge having at least a portion positioned out of alignment with the usual direction of motion of said body; and
 a last channel formed in said flow control surface, said last channel having:
  a forward portion generally facing the front;
  an end portion positioned closer to the rear than said forward portion of said last channel;
  a floor surface extending from said flow control surface at said last channel forward portion to said last channel end portion; and
  a first sidewall extending between said flow control surface and said last channel floor surface and extending between said last channel forward portion and said last channel end portion, said last channel first sidewall forming a last channel first sidewall edge between said last channel first sidewall and said flow control surface, said last channel first sidewall edge having at least a portion positioned out of alignment with the usual direction of motion of said body.

38. The body defined in claim 37 wherein said first channel further includes:
 a second sidewall extending between said flow control surface and said floor surface and extending between said forward portion and said end portion, said second sidewall forming a second sidewall edge between said second sidewall and said flow control surface, said second sidewall edge having at least a portion positioned out of alignment with the usual direction of motion of said body.

39. The body defined in claim 38 wherein said last channel further includes:
 a second sidewall extending between said flow control surface and said last channel floor surface and extending between said last channel forward portion and said last channel end portion, said last channel second sidewall forming a last channel second sidewall edge between said last channel second sidewall and said flow control surface, said last channel second sidewall edge having at least a portion positioned out of alignment with the usual direction of motion of said body.

40. A motor vehicle having a usual direction of motion, said body including a front, a rear, and right and left rear fender areas, said rear fender areas each having a flow control surface, and means to maintain flow of the medium attached to the exterior of said rear fender areas having said flow control surface, said means including:
 a first channel formed in each said fender surface, said first channel having:
  a forward portion generally facing the front;
  an end portion positioned closer to the rear than said forward portion;
  a floor surface extending from said fender surface at said forward portion to said end portion; and
  a first sidewall extending between said fender surface and said floor surface and extending between said forward portion and said end portion, said first sidewall forming a firt sidewall edge between said first sidewall and said fender surface, said first sidewall edge having at least a portion positioned out of alignment with the usual direction of motion of said motor vehicle.

41. The motor vehicle defined in claim 40 wherein said first channel further includes:
 a second sidewall extending between said fender surface and said floor surface and extending between said forward portion and said end portion, said second sidewall forming a second sidewall edge between said second sidewall and said fender surface, said second sidewall edge having at least a portion positioned out of alignment with the usual direction of motion of said motor vehicle.

42. The motor vehicle defined in claim 40 further including:
 a last channel formed in said fender surface, said last channel having:
  a forward portion generally facing the front;

an end portion positioned closer to the rear than said forward portion of said last channel;

a floor surface extending from said fender surface at said last channel forward portion to said last channel end portion; and a first sidewall extending between said fender surface and said last channel floor surface and extending between said last channel forward portion and said last channel end portion, said last channel first sidewall forming a last channel first sidewall edge between said last channel first sidewall and said fender surface, said last channel first sidewall edge having at least a portion positioned out of alignment with the usual direction of motion of said motor vehicle.

43. The motor vehicle defined in claim 42 wherein said last channel further includes:

a second sidewall extending between said fender surface and said last channel floor surface and extending between said last channel forward portion and said last channel end portion, said last channel second sidewall forming a last channel second sidewall edge between said last channel second sidewall and said fender surface, said last channel second sidewall edge having at least a portion positioned out of alignment with the usual direction of motion of said motor vehicle.

44. The motor vehicle defined in claim 42 further including:

a rear area connecting said floor surfaces of said last channels in said right and left fender areas.

45. The motor vehicle defined in claim 44 wherein said rear area includes a cusp portion pointing opposite from the usual direction of motion of said motor vehicle.

46. The means to maintain attached flow as defined in claim 40 wherein said last channel includes a protrusion formed by:

a second sidewall extending from said last channel floor surface generally facing said first sidewall;

a third sidewall extending from said last channel floor surface generally facing away from said first sidewall and intersecting said second sidewall adjacent said last channel end portion; and a roof surface extending from said last channel floor surface to said end portion of said last channel between said second and third sidewalls and forming second and third sidewall edges therewith, at least portions of which are positioned at an angle of attack with the local flow of the flowing medium whereby a series/parallel arrangement of channels is formed.

47. The means to maintain attached flow as defined in claim 46 wherein said protrusion includes a tail light assembly positioned near said last channel end portion.

48. An automobile having a usual direction of motion, a front, a rear, and right and left rear downforce creating tunnels generally aligned with the usual direction of motion, each rear downforce creating tunnels including:

an upper undersurface; and a first channel formed in said upper undersurface, said first channel having:

a forward portion generally facing the front;

an end portion positioned closer to the rear than said forward portion;

a floor surface extending from said upper undersurface at said forward portion to said end portion;

a first sidewall extending between said upper undersurface and said floor surface and extending between said forward portion and said end portion, said first sidewall forming a first sidewall edge between said first sidewall and said upper undersurface, said first sidewall edge having at least a portion positioned out of longitudinal alignment with said tunnel; and a second sidewall extending between said upper undersurface and said floor surface and extending between said forward portion and said end portion, said second sidewall forming a second sidewall edge between said second sidewall and said upper undersurface, said second sidewall edge having at least a portion positioned out of longitudinal alignment with said tunnel.

49. The automobile as defined in claim 48 further including:

a last channel formed in said upper undersurface, said last channel having:

a forward portion generally facing the front;

an end portion positioned closer to the rear than said last channel forward portion;

a floor surface extending from said upper undersurface at said last channel forward portion to said last channel end portion;

a first sidewall extending between said floor surface of said first channel and said last channel floor surface and extending between said last channel forward portion and said last channel end portion, said last channel first sidewall forming a last channel first sidewall edge between said last channel first sidewall and said floor surface of said first channel, said last channel first sidewall edge having at least a portion positioned out of longitudinal alignment with said tunnel; and a second sidewall extending between said floor surface of said first channel and said last channel floor surface and extending between said last channel forward portion and said last channel end portion, said last channel second sidewall forming a last channel second sidewall edge between said last channel second sidewall and said floor surface of said first channel, said last channel second sidewall edge having at least a portion positioned out of longitudinal alignment with said tunnel.

50. The automobile as defined in claim 48 wherein each of said tunnels includes:

a fence bounding said upper surface generally parallel to said first channel, said first sidewall intersecting said fence at said end portion.

51. The means to maintain attached flow as defined in claim 48 wherein said first channel includes:

a fence bounding said upper surface generally parallel to said first channel, said floor surface intersecting said fence at said end portion.

52. The means to maintain attached flow as defined in claim 49 further including:

a fence bounding said upper surface generally parallel to said first and last channels, said first sidewalls and said floor surfaces of said first and last channels intersecting said fence at said end portions thereof.

53. The means to maintain attached flow as defined in claim 49 further including:

a fence bounding the flow control surface generally parallel to said first and last channels, said floor surfaces of said first and last channels intersecting said fence at said end portions thereof.

* * * * *